United States Patent

[11] 3,614,691

| [72] | Inventor | Saburo Miyata |
| | | 19-47, Takanawa 3-chome Minato-ku, Tokyo, Japan |
| [21] | Appl. No. | 859,434 |
| [22] | Filed | Sept. 19, 1969 |
| [45] | Patented | Oct. 19, 1971 |

[54] DEVICE FOR TREATING HYDROCARBON FUEL
10 Claims, 4 Drawing Figs.

| [52] | U.S. Cl. | 335/306 |
| [51] | Int. Cl. | H01f 7/02 |
| [50] | Field of Search | 335/306, 209; 123/119 E |

[56] References Cited
UNITED STATES PATENTS

| 3,349,354 | 10/1967 | Miyata | 335/306 |
| 3,110,294 | 11/1963 | Nyman | 123/119 E |
| 3,266,783 | 8/1966 | Knight | 123/119 E |

FOREIGN PATENTS

| 814,269 | 6/1959 | Great Britain | 123/119 E |

*Primary Examiner*—Harold Broome
*Attorney*—Jay M. Cantor

ABSTRACT: A device for treating hydrocarbon fuel to improve combustion thereof in an internal combustion engine. A pair of permanent magnets are supported in a casing with like poles facing each other and separated by a small gap. The spaced faces of the magnets are connected to opposite poles of a source of electricity to superimpose an electrostatic field in the space between the magnets. A pair of conduits are connected to the casing to conduct the fuel through the gap.

PATENTED OCT 19 1971 3,614,691

INVENTOR.
SABURO MIYATA
BY Harold L. Halpert
Agent

DEVICE FOR TREATING HYDROCARBON FUEL

This invention relates to a device for treating hydrocarbon fuel and more particularly to a device for treating hydrocarbon fuel to improve the combustion thereof in an internal combustion engine and is an improvement over my U.S. Pat. No. 3,349,354.

Incomplete combustion reduces the power obtainable from a given amount of fuel, increases the pollutants in the exhaust emissions which are conducive to the production of "smog" in the atmosphere, and is conducive to the buildup of carbon on the internal cylinder walls and sparking plugs.

It is an object of this invention to treat liquid hydrocarbon fuel to improve the efficiency of combustion in an internal combustion engine. It is a further object of this invention to produce a device for treating hydrocarbon fuel as aforesaid to improve the atomization thereof for cleaner burning.

It is a further object of this invention to produce a device for treating hydrocarbon fuel as aforesaid to permit the use of high compression without detonating the fuel.

Figure 1:
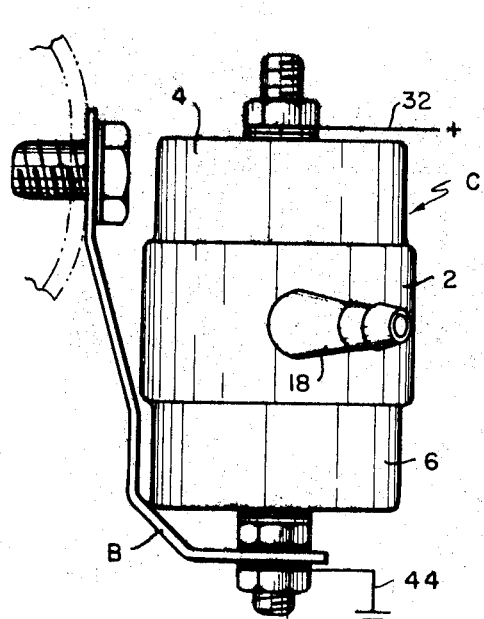
Figure 2:
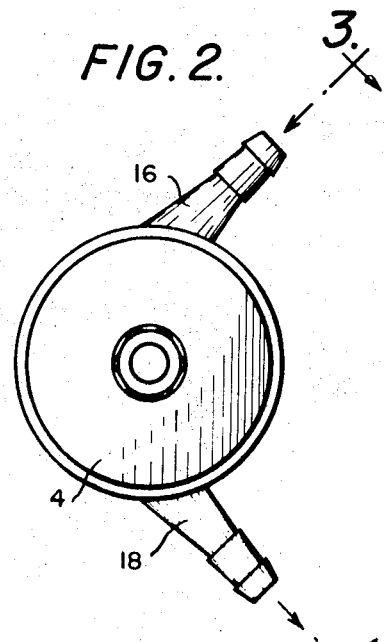
Figure 3:
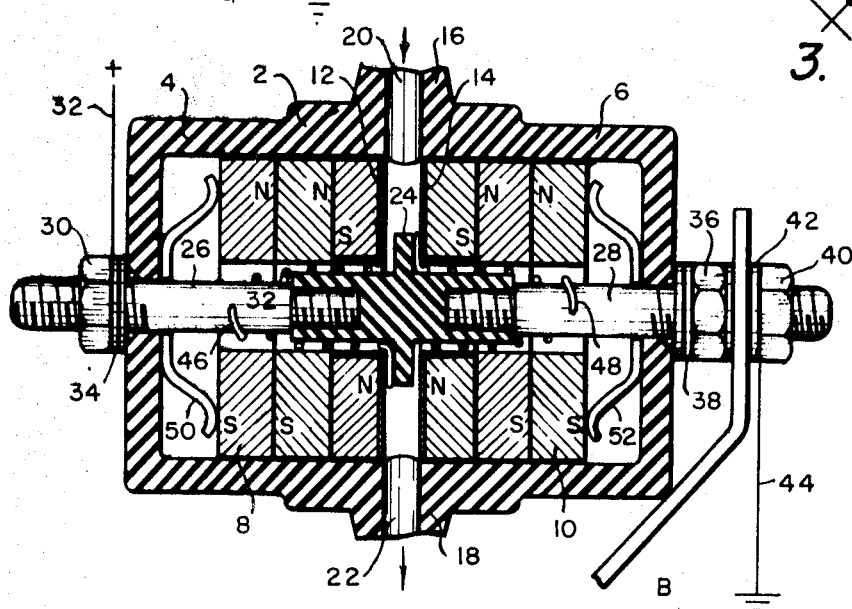
Figure 4:
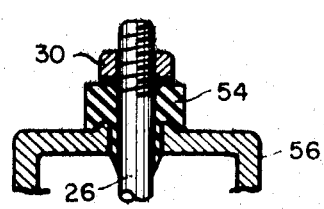

These and other objects of the invention will become manifest upon reading the following description in conjunction with the accompanying drawing wherein:

FIG. 1 is a side elevation of the apparatus of this invention,
FIG. 2 is a plan view of FIG. 1 with parts omitted,
FIG. 3 is a view along broken line 3—3 of FIG. 2, and
FIG. 4 is a modification of the electrical connector.

In accordance with the invention the fuel is passed between magnets of the same polarity before being supplied to the carburetor or the injector pump of engines which operate on direct injection of the fuel into the cylinder. The opposite poles of the magnets are located remote from the fuel passage. An electrostatic field is superimposed over the magnetic field in the passage between the magnets.

With reference to the drawing there is disclosed a casing C of insulating material comprising a body portion 2 and cap sections 4 and 6 secured thereto as by well known adhesives. A plurality of stacked magnets 8 are supported in one end of the casing by having their peripheries in contact with the inner wall of the casing and are oriented with their N poles facing the opposite end of the casing. A similar stack of magnets 10 is similarly supported with their N poles facing the other stack of magnets. The facing N poles 12 and 14 are separated by a gap of 1 or 2 mm. by means to be presently described to provide a flow path for the fuel. Inlet and outlet nipples 16 and 18 having bores 20 and 22 opening into the space between the magnets conduct the fuel into and out of the casing.

In the form of the invention illustrated in FIG. 3 the magnets are made of ferrite. The pole faces 12 and 14 are provided with a metal coating, such as foil or sprayed metal. An insulating separator of nylon having a flange 24 is formed to threadedly receive a pair of brass studs 26 and 28 which extend through the casing walls and form electric terminals. Stud 26 is supplied with a nut 30 to clamp a conductor 32 between a washer 34 and the nut and to clamp the washer against the casing wall. Stud 28 is supplied with a nut 36 and 38 to clamp the washer against the casing wall. A nut and washer 40 and 42 clamp a bracket B for supporting the device on a suitable support and clamp a conductor 44 into firm electrical contact. A coiled wire 46, in the form of a helical spring, has one end wrapped around the stud 26 and a free end extending between the flange 24 and the metal coating. A coiled wire 48, in the form of a helical spring, has one end wrapped around the stud 28 and a free end extending between the flange 24 and the metal coating. Wires 46 and 48 form conductive paths for carrying current from a source of electricity to the metal coatings.

Springs 50 and 52 urge the stacks of magnets toward each other and press the free ends of conductors 46 and 48 against the metal coating.

In operation, fuel is conducted into and out of the casing by entering and leaving through the nipples 16 and 18 as indicated by the arrows. The fuel is subjected to the magnetic influence of the permanent magnets and the electrostatic field as it passes through the gap between the coated magnets.

If "Alnico" magnets are used the metal coatings 12 and 14 are unnecessary since "Alnico" is a conductor of electricity.

If a metal casing is used, such as illustrated in FIG. 4, the positive terminal is supplied with an insulating bushing 54 between terminal 26 and the metal cap 56.

While I have disclosed the treatment of liquid hydrocarbon fuel for use in an internal combustion engine it is to be understood that the invention is applicable to other liquid hydrocarbon burning devices such as oil burners for furnaces, jet engines, etc.

I claim:
1. An apparatus for treating liquid hydrocarbon fuel comprising a casing, a pair of spaced magnets having facing like poles mounted in said casing, conduit means opening into the space between the magnets for conducting fuel into and out of said casing between said magnets, and means for superimposing an electrostatic field between the like facing poles wherein the means for superimposing the electrostatic field comprises conductors connecting the facing poles to opposite poles of a source of electricity.

2. An apparatus as defined in claim 1 wherein said casing is of nonconductive material and wherein said spaced magnets are supported by the inner wall of the casing.

3. An apparatus as defined in claim 2 further including additional magnets stacked on the nonfacing sides of said facing magnets and oriented to face the like poles in the same direction as the like poles of the facing magnets.

4. An apparatus as defined in claim 3 wherein the magnets are ferrite.

5. An apparatus as defined in claim 1 wherein the means for superimposing the electrostatic field comprises a metal coating on the facing surfaces of the magnets.

6. An apparatus for treating liquid hydrocarbon fuel comprising a casing, a pair of spaced magnets having facing like poles mounted in said casing, conduit means opening into the space between the magnets for conducting fuel into and out of said casing between said magnets, and means for superimposing an electrostatic field between the like facing poles and transverse to the axis of said conduit means.

7. An apparatus as defined in claim 6 wherein said casing is of nonconductive material and wherein said spaced magnets are supported by the inner wall of the casing.

8. An apparatus as defined in claim 7 further including additional magnets stacked on the nonfacing sides of said facing magnets and oriented to face the like poles in the same direction as the like poles of the facing magnets.

9. An apparatus as defined in claim 8 wherein the magnets are ferrite and the means for superimposing the electrostatic field comprises a metal coating on the facing surfaces of the spaced magnets, and means connecting said coatings to opposite poles of a source of electricity.

10. An apparatus as defined in claim 6 wherein the means for superimposing the electrostatic field comprises a metal coating on the facing surfaces of the magnets, and means connecting said coatings to opposite poles of a source of electricity.